US009503462B2

(12) United States Patent
Asokan et al.

(10) Patent No.: US 9,503,462 B2
(45) Date of Patent: Nov. 22, 2016

(54) AUTHENTICATING SECURITY PARAMETERS

(75) Inventors: Nadarajah Asokan, Espoo (FI); Govind Krishnamurthi, San Diego, CA (US); Tat Chan, San Diego, CA (US)

(73) Assignee: Nokia Technologies Oy, Espoo (FI)

( * ) Notice: Subject to any disclaimer, the term of this patent is extended or adjusted under 35 U.S.C. 154(b) by 1453 days.

(21) Appl. No.: 11/672,900

(22) Filed: Feb. 8, 2007

(65) Prior Publication Data

US 2008/0195867 A1 Aug. 14, 2008

(51) Int. Cl.
*H04L 9/32* (2006.01)
*H04L 29/06* (2006.01)
*G06F 21/32* (2013.01)
*H04W 12/08* (2009.01)

(52) U.S. Cl.
CPC ............ *H04L 63/126* (2013.01); *G06F 21/32* (2013.01); *H04L 63/0861* (2013.01); *H04L 63/1466* (2013.01); *H04W 12/08* (2013.01); *H04L 63/0869* (2013.01); *H04L 63/1441* (2013.01)

(58) Field of Classification Search
CPC ............ H04L 9/3231; H04L 63/0861; H04L 2209/80; G06F 21/31; G06F 21/32; G06F 21/35; H04W 12/06; H04W 12/08
USPC ................... 713/168–169, 150, 186; 726/30; 380/283
See application file for complete search history.

(56) References Cited

U.S. PATENT DOCUMENTS

| 5,450,493 A | 9/1995 | Maher |
| 5,515,441 A | 5/1996 | Faucher |
| 5,913,196 A * | 6/1999 | Talmor .................... G10L 17/00 704/270 |
| 6,128,742 A * | 10/2000 | Felt .................................. 726/5 |
| 7,308,708 B2 * | 12/2007 | Blume ............................. 726/5 |
| 2007/0112775 A1* | 5/2007 | Ackerman ........................ 707/9 |

OTHER PUBLICATIONS

Goodrich MT, Loud and Clear: Human-Verifiable Authentication Based on Audio Distrubuted Computing Systems, 2006.*
Goodrich, et al. "Loud and Clear: Human-Verifiable Authentication Based on Audio", 2006.*
Wu, et al. "Secure Human Communications Based on Biometrics Signals", 2005.*
McCune et al., Seeing-Is-Believing: Using camera phones for human-verifiable authentication. Proceedings of the 2005 IEEE Symposium on Security and Privacy, May 8-11, 2005, p. 110-124. XP010798367.
Goodrich et al.,: Human-Verifiable Authentication based on audio. Proceedings of the 26$^{th}$ IEEE International Conference on Distributed Computing Systems. Jul. 4-7, 2006, p. 10-10. XP010927315.
Berta and Vajda, Documents from malicious terminals. Laboratory of Cryptography and Systems Security, Apr. 2003. XP002481032.
International Search Report for PCT Application No. PCT/EP2008/050619.

(Continued)

*Primary Examiner* — Daniel Potratz
(74) *Attorney, Agent, or Firm* — Harrington & Smith (57) ABSTRACT

A method for authenticating communicating parties is disclosed. In the method biometric information associated with a first party is generated based on a recording of the first party presenting a predefined input parameter. Said biometric information may then be transmitted to a second party. Authenticity of a security parameter associated with the first party can then be verified based on said biometric information.

38 Claims, 4 Drawing Sheets

(56) References Cited

OTHER PUBLICATIONS

Blossom, E. "The VP1 Protocol for Voice Privacy Devices Version 1.2," Aug. 7, 1997.

Boyko, V., et al. "Provably Secure Password-Authenticated Key Exchange Using Diffie-Heilman", Eurocrypt 2000, Jul. 2000.

Diffie, W., et al. "Authentication and Authenticated Key Exchanges," Designs, Codes, and Cryptography, 2(2): 107-125, Mar. 1992.

Krawczyk, Hugo. "Sigma: The 'SIGn-and MAc' Approach to Authenicated Diffie-Hellman and its Use in the IKE Protocols," Jun. 12, 2003.

Wu, Y, et al. "Secure Human Communications BAsed on Biometrics Signals," 20th IFIP International Information Security Conference (SEC 2005), p. 205-221., Chiba, Japan, May 30-Jun. 1, 2005.

Zimmermann, P.; "PGPfone: Pretty Good Privacy Phone Owner's Manual"; http://web.mit.edu/network/pgpfone/manual/; Jan. 5, 1996; whole document (31 pages).

"Zfone"; http://zfoneproject.com/prod_zfone.html; Feb. 26, 2005; whole document (1 page).

\* cited by examiner

AUTHENTICATING SECURITY PARAMETERS

BACKGROUND OF THE INVENTION

Field of the Invention

The present invention relates to security parameters in a communication system, and more particularly, to verifying the authenticity of at least one security parameter exchanged between communicating parties.

Description of Related Art

A user may communicate with other parties by means of an appropriate communication device. The communication may be provided either via a communication system comprising at least one network or directly between communication devices of the parties. A user may be provided with numerous services via his/hers communication device. Non-limiting examples of these services include two-way or multi-way calls, data communication or multimedia services and access to a data communications network system, such as the Internet. A user may also be provided broadcast or multicast content.

A communication system is a facility which enables communication between two or more parties such as communication devices, network entities such as servers and other nodes. A communication system is typically adapted to operate in accordance with at least one communication protocol. Examples of communication systems include fixed line communication systems, such as a public switched telephone network (PSTN), local area networks (LAN) and wireless communication systems, such as a public land mobile network (PLMN), satellite based systems and wireless local area networks (WLAN). A simple communication system can be understood to be provided by two or more devices that can communicate directly with each other.

In communication systems a problem relates to ensuring that the different parties in the communication can trust that the communication devices involved in the communications are indeed authorized to participate in the communications. This can be important especially in applications where confidential information is transferred between different communication devices.

An approach to increase security is based on exchange of particular security parameters between the communicating parties. A number of different mechanisms have been proposed for the exchange of security parameters between communicating parties. The proposals for the exchange mechanism include, for example, security key exchange mechanisms that are based on a shared secret such as a password. These techniques include, for example, a key pair including of a public key and a private key. In such an arrangement, a user has a public key that the user can send unencrypted to a counter party. Unlike in Public Key Infrastructure (PKI) based systems, where the authenticity of the public keys is verified based on certificates, in these arrangements the verification of the authenticity of the public keys is based on shared secrets. The user can also have a private key that does not have to be transferred to the communication system at any stage, but is instead maintained in secrecy. By means of these it is possible to transmit encrypted information to a party by encrypting the information with the public key. The party can then decrypt the information with his/her private key.

An example of such key exchange mechanism is discussed by V. Boyko, P. Mackenzie and S. Patel in an article 'Provably Secure Password-Authenticated Key Exchange Using Diffie-Hellman', Eurocrypt 2000, July 2000. This proposal uses the so-called Diffie-Hellman technique, a public key based algorithm employing an exponentiation modulo of a large prime number. In accordance with the Diffie-Hellman technique, a first party determines a first key number on the basis of a first secret number and the first key number is transmitted to a second party. Correspondingly, the second party determines a second key number on the basis of a second secret number and the second key number is transmitted to the first party. Thereafter the first party generates a third key number on the basis of the first secret number and the second key number it has received, and the second party generates a fourth key number on the basis of the second secret number and the first key number it has received. The third and the fourth key numbers are identical, and are not transmitted between the parties involved. The third and the fourth key number can be used for encryption and decryption of information to be transmitted between the parties, or to derive cryptographic keys for use by other secure mechanisms.

However, it is possible for a third party to become able to change the first key number or the second key number in a mechanism that is based on the Diffie-Hellman technique or in any other technique where asymmetric exchange of public keys takes place without external means, such as a certificate, for authenticating the public keys. This can take place, for example, such that the third party places itself between the first party and the second party, where after the first party may mistake the third party for the second party, and, in a corresponding manner, the second party may mistake the third party for the first party. This is known as the Man in the Middle (MITM) attack. Thus it is possible for data to be transmitted between the first and the second party via the third party, meaning that the third party can detect and intercept messages transmitted by the first party and the messages transmitted by the second party. This leaves the messages vulnerable for example for third party modifications.

The above mechanism for exchanging authenticated keys also rely on pre-existing information such as shared secret and public-private key pairs at the communicating parties. Such pre-existing information, however, may not always be available when parties wish to communicate.

Certain proposals for overcoming this use a security protocol between the parties that results in a short checksum. Each user then speaks out and send the recording of the checksum. One of the users may then verify that the checksum is the same as that displayed on his device and that the voice speaking the checksum does indeed belong to the correct peer. This approach is not without weaknesses either. Firstly, fresh Diffie-Hellman public/private key pairs need to be generated for each session. This may not be computationally feasible for all devices. Each byte of the checksum may need to be mapped to a dictionary of 256 words or the checksum may need to be encoded in a base such as 32 or 256. Thus what the user sees/verifies is only string of alphanumeric characters. If an attacker manages to get hold of the recordings of a user speaking out all 256 words or each alphanumeric character, he might be able to mount a successful attack.

Another security mechanism is based on a question-answer model. An example of such is discussed by Yongdong Wu, Feng Bao and Robert H. Deng in a conference paper 'Secure Human Communications Based On Biometrics Signals', 20th IFIP International Information Security Conference (SEC 2005), pp. 205-221, Chiba, Japan, May 30-Jun. 1, 2005. This proposal combines a question answer mechanism with the Diffie-Hellman type key exchange such that secure communications can be established without relying on either shared secrets or a Public Key Infrastructure (PKI). In this mechanism, the parties exchange voice samples of a specific challenge/response in the forms of conversational questions/answers such that the challenge is formed by a voice clip of a party asking a question and the response is a voice clip of the responder answering the question.

The security of this scheme depends on the response being generated within a certain timeout, and also that the response containing some fresh information that precludes the use of playing back a pre-recorded response. The paper recommends that the question and response should include the time of day and some topical information like "how was your exam today?" A drawback of this scheme is that it relies on the users to select questions such that the answers contain timely information.

SUMMARY

The herein disclosed embodiments aim to address one or more of the above issues.

In accordance with an embodiment there is provided a method for authenticating communicating parties. In the method biometric information associated with a first party is generated based on a recording of the first party presenting a predefined input parameter. Said biometric information is then sent to a second party. Authenticity of a security parameter associated with the first party can then be verified based on said biometric information.

In accordance with a further embodiment, subsequent to a positive verification of the authenticity by the second party, biometric information associated with the second party is generated based on a recording of the second party presenting a predefined input parameter, where after said biometric information associated with the second party is sent to the first party, and authenticity of a security parameter received from the second party is verified based on said biometric information associated with the second party.

Another embodiment provides an apparatus, comprising a recording device configured to generate biometric information associated with a user thereof based on a presentation by the user of a predefined input parameter. The apparatus also comprises an interface configured to send the biometric information for use in authentication of a security parameter associated with the user.

Yet another embodiment provides apparatus comprising an interface configured to receive biometric information associated with another party, the biometric information being based on a presentation by the other party of a predefined input parameter and a processor configured to verify the authenticity of a security parameter associated with the other party based on the biometric information.

A further embodiment provides a method for authenticating parties in a communication system, the method comprising recording a media clip of a party presenting an input parameter, using the media clip as a signature of a security parameter associated with the party, and sending the security parameter with the signature to a second party.

A yet further embodiment provides a method for authenticating parties in a communication system, the method comprising sending a first message including a hash of a security parameter and a first random value from a first party to a second party and sending a second message including a second random value from the second party to the first party and sending a third message including the first random value from the first party to the second party. The method of this embodiment also comprises generating biometric information associated with the second party based on a recording of the second party presenting an input parameter that is based on the information in the first message, the second message and the third message, sending said biometric information to the first party, generating biometric information associated with the first party based on a recording of the first party presenting the input parameter, and sending said biometric information to the second party.

A computer program embodied on a computer-readable medium may also be provided, the computer program being configured to provide a method described herein. In more specific embodiments an input parameter comprises at least one of a public key, a Diffie-Hellman parameter, a random challenge, a time indication, a value provided by a combination of random values generated by the first party and the second party, a shared key, a message authentication code, and a dictionary identifier.

Biometric information may be communicated in a message that also contains a security parameter. The security parameter may be provided by at least one of a public key, a Diffie-Hellman parameter, a random challenge and a time indication.

The biometric information may comprise a transformation function denoting a biometric rendering. Generation of biometric information may comprise recording a media clip wherein a party presents the input parameter.

BRIEF DESCRIPTIONS OF THE DRAWINGS

For a better understanding of the present invention and how the same may be carried into effect, reference will now be made by way of example only to the accompanying drawings in which.

DESCRIPTION OF EXEMPLIFYING EMBODIMENTS

Figure 1:
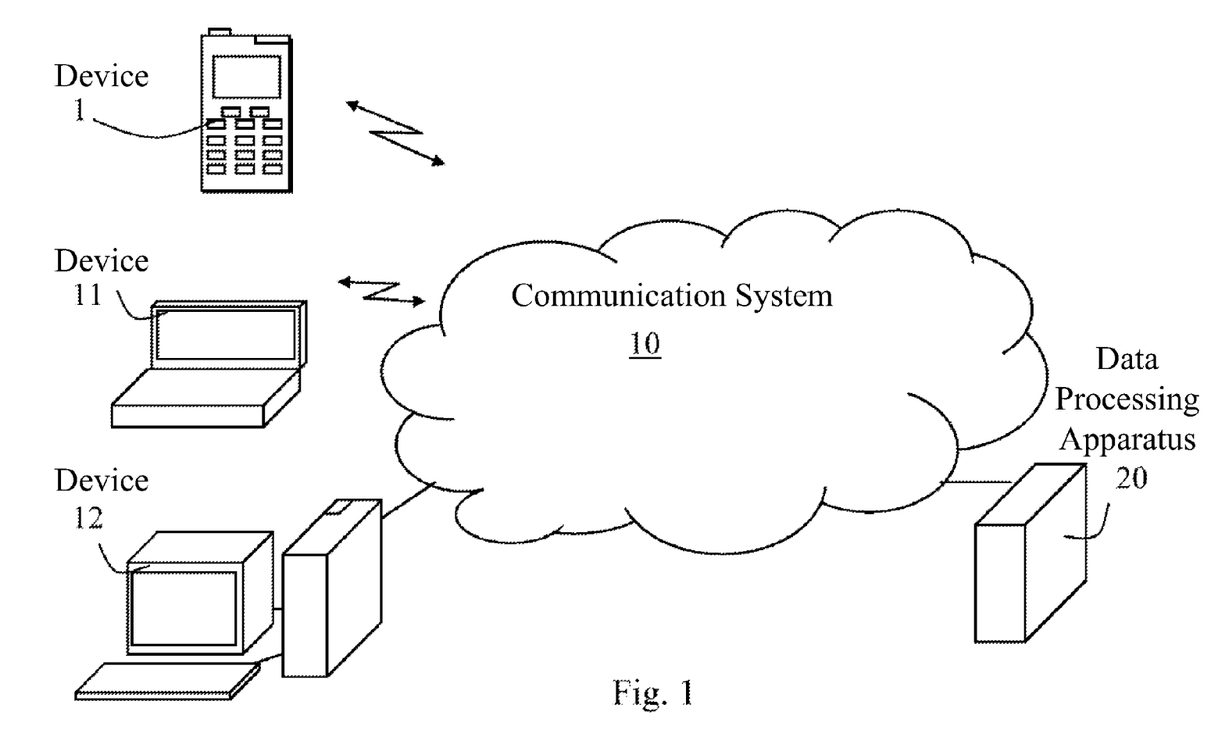
FIG. 1 shows a schematic presentation of an exemplifying communication system wherein parties may need to exchange security details.

Before explaining in detail certain exemplifying embodiments, certain general principles of communicating between parties via a communication system are briefly explained with reference to a system shown in FIG. 1. An explanation of a possible communication device is also given with reference to FIG. 2.

A user can use an appropriate communication device, for example any of devices 1, 11 or 12 for communication with other parties via a communication system 10. The user may also access various services and/or applications provided by data processing apparatuses 20 via the communication system 10. The communication system may be adapted for packet switched and/or circuit switched communication. The communication system 10 may comprise one or more communication networks. For example, the user may be connected to a mobile or fixed line telecommunication network which is connected via suitable gateway arrangement to a data network, for example to an Internet Protocol (IP) network. The user may also be connected to the data network via a local area network.

The user devices may be provided with a wireless access interface or a fixed access interface by means of an appropriate access system. For example, a user of mobile communication devices 1 or 11 can access wirelessly the communication system via at least one base station or similar wireless transmitter and/or receiver node. The user devices 1, 11 and 12 can be used for various tasks such as making and receiving phone calls, for receiving and sending data from and to a data network and for experiencing, for example, multimedia or other content. An appropriate user device can be provided by any device capable of at least sending and/or receiving signals. The user device is also typically provided with at least one data processor and at least one memory. Non-limiting examples include a mobile station (MS), a portable computer provided with a wireless interface card or other wireless interface facility, personal data assistant (PDA) provided with wireless communication capabilities, a desktop personal computer or any combinations of these or the like.

Figure 2:
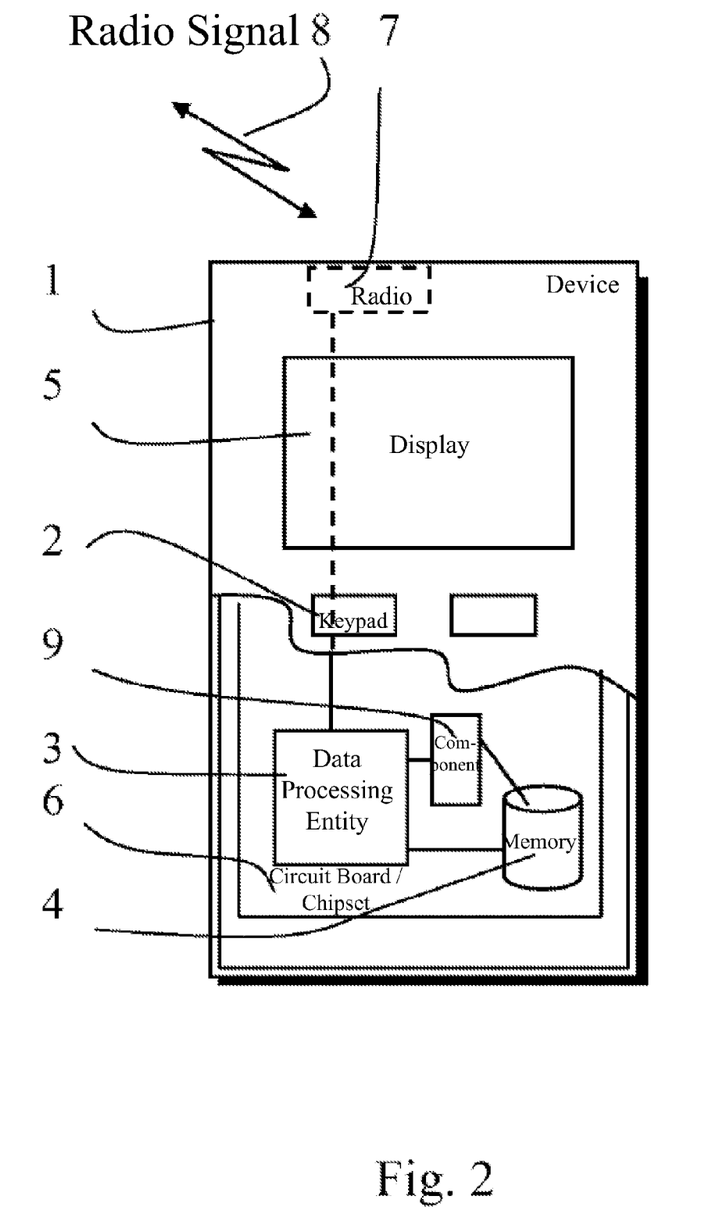
FIG. 2 shows a partially sectioned view of an exemplifying communication device.

FIG. 2 shows a schematic partially sectioned view of an exemplifying communication device, and more particular of a mobile communication device 1 that can be used for communication with other parties. An appropriate mobile communication device may be provided by any device capable of sending and receiving radio signals 8. The receiver may be provided for example by means of a radio part and associated antenna arrangement. In FIG. 2 a radio part of the device is designated schematically by block 7. The antenna arrangement may be arranged internally or externally to the mobile device.

A mobile device is typically provided with at least one data processing entity 3, at least one memory 4 and other possible components 9 for use in tasks it is designed to perform. The data processing, storage and other entities can be provided on an appropriate circuit board and/or in chipsets. This feature is denoted by reference 6. The user may control the operation of the mobile device by means of a suitable user interface such as key pad 2, voice commands, touch sensitive screen or pad, combinations thereof or the like. The user interface also typically comprises a display 5, a speaker and a microphone. Furthermore, a mobile device may comprise appropriate connectors (either wired or wireless) to other devices and/or for connecting external accessories, for example hands-free equipment, thereto.

The herein described embodiments employ mechanisms that are based on use of biometric information for enabling users to establish security parameters, for example keys, between the parties. The established security parameters can be used to provide secure communications between the parties. According to a possibility the mechanism is used to verify the authenticity of security parameters during a communication session.

In the exemplifying mechanisms the parties are enabled to exchange public keys or public key messages in a secure manner. The keys may be any appropriate keys, for example $g^x$ keys in accordance with the Diffie-Hellman based key arrangements. The parties may not need to have any pre-existing security associations, for example a shared secret or a Public Key Infrastructure (PKI). This is facilitated by use of biometrics information in the key exchange. This is exemplified by the following embodiments.

Figure 3:
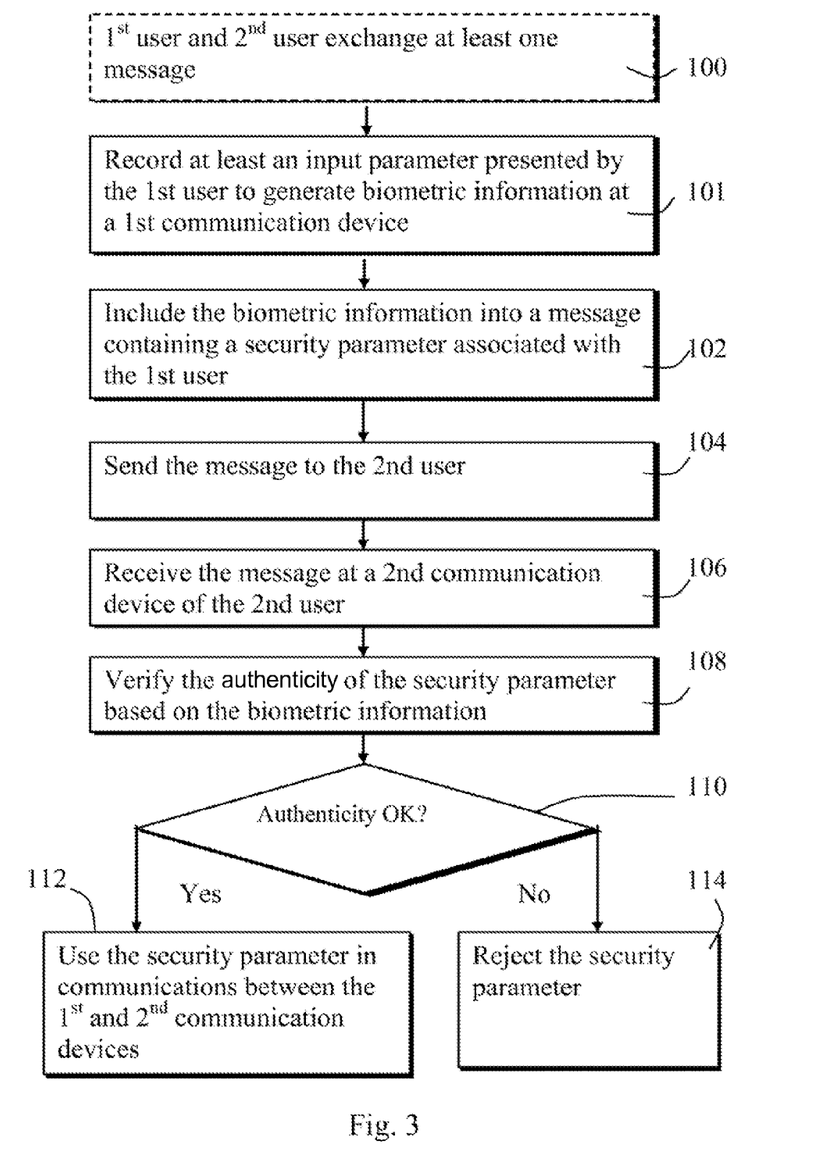
FIGS. 3 and 4 are flowcharts in accordance with certain embodiments.

FIG. 3 shows a flowchart for operating in accordance with an embodiment. A user makes at step 101 a recording of a biometric rendition of certain input parameter. The biometric rendition can be, for example, a voice or video recording of the user speaking a particular text or other string of characters. More detailed examples of the possible forms of input parameters, biometric information and calculations are given later in this specification.

In accordance with an embodiment, the parties exchange one or more messages at an optional step 100. This may be employed in certain exemplifying embodiments described below so that an input parameter to a biometric rendition process can be derived from information exchanged between the parties before any recordings are made.

The biometric information resulting from 101 may then be included at 102 as a signature in a message that contains a security parameter associated with the user. The security parameter may be, for example a public key of the user, a key shared between the parties, a random value, a challenge and so on. The message is then send at 104 to a second party which receives it at 106. The second, receiving party may then verify at 108 the authenticity of the security parameter it received from the first party based on the biometric information also included in the message.

If the verification is positive at 110, the security parameter is successfully authenticated and can be used in communications between the parties at 112. If the authentication fails, the received parameter is rejected and an appropriate procedure may follow. For example, the security parameter may simply be rejected, as shown in 114, or a procedure for a further verification may be initiated instead of a straightforward rejection.

The decision regarding the authenticity at the second party may be taken by the user of the recipient device. The verification process may also be provided automatically by the recipient communication device.

Figure 4:
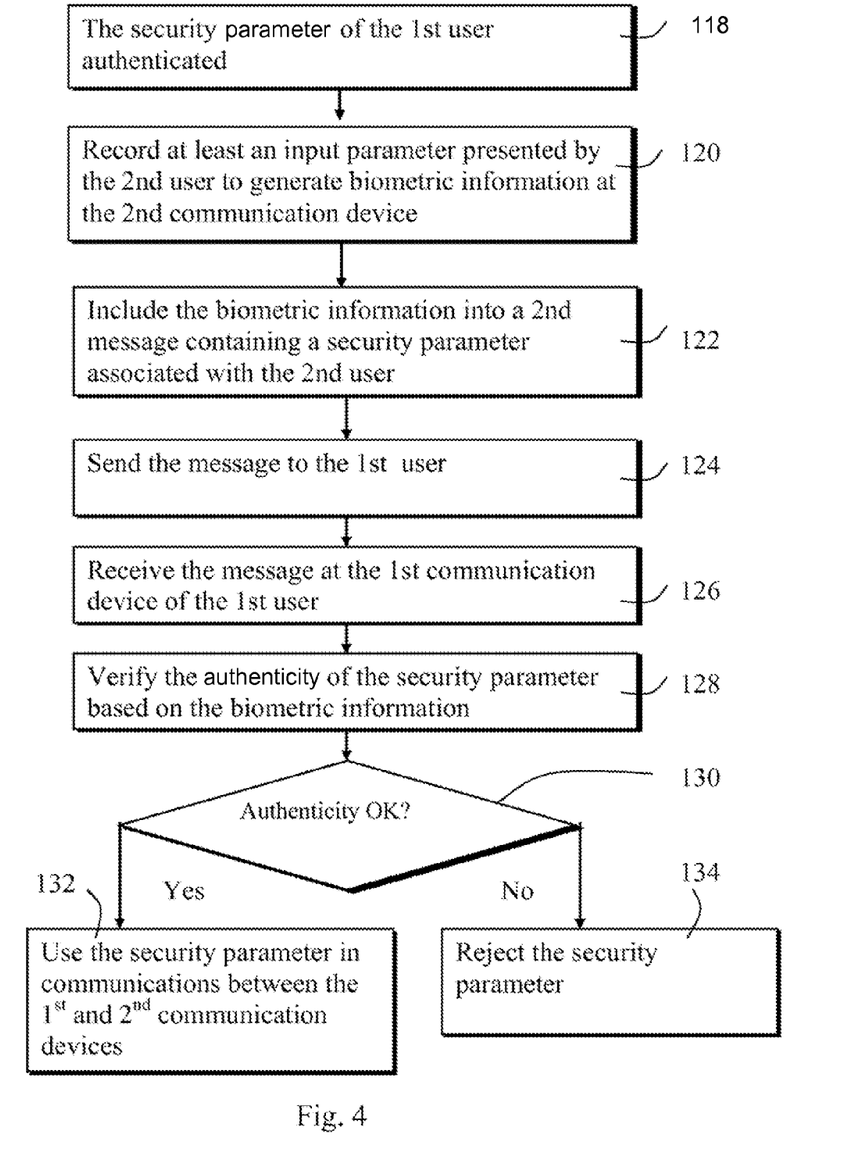

FIG. 4 shows a flowchart for operating in accordance with a further embodiment wherein the second party responds the message communicated in FIG. 3 embodiment by sending at least one security parameter to the first user. This is shown to be accomplished in response to a positive verification by the second party at 118.

To prepare the response, the second user also records at 120 the second user presenting a predefined input parameter and generates biometric information associated with the second party based on the recording. The biometric information is then included at 122 in a response message that contains the security parameter associated with the second party user. This parameter does not need to be similar than the one received from the first party. The response message is then send at 124 to the first party which receives it at 126. The first party may then verify at 128 the authenticity of the security parameter based on the biometric information the second party included in the message. If the verification is positive at 130, the security parameter of the second party is also successfully authenticated and can be used in communications between the parties at 132. If the authentication fails, the parameter can be rejected at 134 and an appropriate procedure may follow.

In the following a number of different examples of possible key exchange mechanisms are discussed with reference to communications between parties A and B.

In a first example the following exchange protocol is used between parties A and B:

1. A→B: $Bio_A(V(U[P_A]))$, $P_A$

2 A←B: $Bio_B(V(U[P_B]))$, $P_B$

In this exchange protocol security parameters $P_A$ and $P_B$ denote public keys or public key messages. The public keys may be provided, for example, by Diffie-Hellman parameters $g^A$, $g^B$.

Function U[ ] may be provided by an identity function. Alternatively, it can be provided by a one-way hash function, for example a secure hash algorithms such as SHA-1, SHA-256 or similar hash algorithm. Function U[ ] may also be a one-way hash function with a short range, for example a truncated hash function. A shortened hash function may be desired in applications wherein id is desired to reduce the amount of information that needs to be exchanged between the parties.

Function $Bio_X(\ )$ is a transformation function that denotes a biometric rendering. The function may represent a media clip recording where a party X presents an input parameter. The media clip may be, for example, an audio or video clip where party X reads, writes by hand or otherwise inputs an appropriate input parameter that captures a personal feature of the party. For example, $Bio_X(m)$ stands for a voice recording of a user speaking a text represented by m.

Function $V(\ )$ is then a function for converting an input data stream to a format that is suitable for biometric rendering. There are multiple ways for doing this, two non-limiting examples of these being given below.

$V(\ )$ can be a function that converts the input parameters from a bit string to a hexadecimal representation to make the reading thereof easier. For example, if $U[P_A]$, is a 160-bit string, the information to be presented, i.e. $V(U[P_A])$, is the hexadecimal value of the 160-bit string, such as "0A0B1C4D . . . ". $Bio_x(V(U[P_X]))$ in this case means that party X (e.g. A or B) has to, for example, read out the string in hexadecimal format, i.e. "0A0B1C4D . . . " In this example, 40 characters would need to be recorded by a party.

According to another example vocalizable and readable representations where the input parameter is converted to a syntactically-correct text. This can be provided, for example, using techniques discussed by Goodrich et al in the article "Loud And Clear: Human Verifiable Authentication Based on Audio", IEEE ICDCS 2006. The conversion may be based on, for example, "MadLib" type puzzles. The MadLib" puzzles as such are known and are commonly used in applications such as games and plays. These puzzles are based on sets of parts of speech, for example verbs, nouns and so on. The input parameter is mapped to the members of these sets to yield a sentence which is easier to render biometrically than the corresponding input parameter. In this type of implementation, the input parameter can be divided into 10-bit segments, each of which is mapped to a word in the MadLib dictionary. The words are then fit into the MadLib template to form the sentence.

An example of a MadLib sentence encoding a 70-bit string is as follows (the filled-in words/word-phrases are in caps):

DONALD the FORTUNATE BLUE-JAY FRAUDULENTLY CRUSH-ed over the CREEPY ARCTIC-TERN.

The input parameter may consist of numbers 23 and 45 which is mapped to the members of the sets such that $23^{rd}$ noun is "DONALD" and $45^{th}$ verb is "CRUSH-ed" to yield a sentence "DONALD CRUSH-ed" which is easier to speak out loud than the corresponding input parameter "2345".

$Bio_x(V(U[P_X]))$ function in this case is provided so that the party X records a media clip of himself/herself reading in loud the above sentence.

Based on the above exchange protocol parties may exchange public keys $P_A$ and $P_B$. To authenticate the public keys, a sending party attaches a media clip that he/she recorded as explained above. The media clip then serves as a signature of the sending party on his/hers public key. A receiving party can then verify the media clip and ensure that the key came from the sending party.

Different $U[\ ]$ functions can be used to provide a trade-off between usability and security. In certain applications an identity function may provide a better security because an attacker cannot substitute the $P_A$ parameter. However, the amount of information to be biometrically rendered by the sending party may become too long. In such instances a one-way hash function can be used to reduce the amount of information required to be read.

The above described embodiment allows parties A and B to exchange public keys securely in applications where the public keys may be intended for one-time use only. Re-using already exchanged public keys using the above embodiment may, however, be less desirable in certain applications because of the lack of a built-in replay protection mechanism. For long-term public keys, the following challenge-response mechanism may thus be more appropriate.

The exchange protocol of this embodiment can be written as:
1. A→B: $C_A$, $P_A$
2. A←B: $Bio_B(V(f(C_A, C_B, P_B)))$, $P_B$, $C_B$
3. A→B: $Bio_A(V(f(C_B, C_A, P_A)))$ where
$C_A$ and $C_B$ are random challenges generated by parties A and B respectively; and
function $f(\ )$ is a cryptographic hash function.

After receiving the challenge $C_A$, party B may create a response $f(C_A, C_B, P_B)$ based on the received challenge $C_A$ and his/her own public key, $P_B$ and its own freshly generated challenge, $C_B$. The response is converted to a presentable string through the $V(\ )$ function and then converted to a media clip by the $Bio_B(\ )$ transformation as explained above. Party B may also send the challenge $C_B$ to party A, together with the media clip, and public key $P_B$. Party A may then verify that the media clip is indeed performed by party B, and that the information read is as claimed. If successful, party A may similarly generate a response, which is converted to a media clip by the $V(\ )$ function and $Bio_A(\ )$ transformation. Party A then sends the media clip back to party B. Party B can then also verify the media clip.

An alternative approach is to make use of time-stamp instead of challenge-response, for example as follows. The exchange protocol of this embodiment can be expressed as:
1. A→B: $T_A$, $Bio_A(V(U[f(T_A, P_A)]))$, $P_A$
2. A→B: $T_B$, $Bio_B(V(U[f(T_B, P_B)]))$, $P_B$, wherein $T_A$ and $T_B$ denote the current local time of the respective party.

With this exchange protocol, information about the current local time of the party ($T_A$, $T_B$) may be included in the biometric information sent. A value is computed based on the local time of party A $T_A$ and $P_A$, which is then passed to $U[\ ]$. The result is converted to a readable string through the $V(\ )$ function. The party A may then record a media clip using the transformation $Bio_A(\ )$ as explained above. Party B verifies the media clip it received, and if successful, performs the same procedure. With the local time information included in the generation of the media clip, this approach may provide replay protection, and therefore can be used for authenticating exchanges of long-term public keys. In this approach synchronization of the clocks of the two parties may be needed.

A hash function with short range (for example a truncated hash function) may be used to provide function $U[\ ]$. This function might be desired since although the information to be spoken by a party can be relatively short, at the same time the collision rate may become unacceptable high. A procedure employing check strings and/or random values may be used to increase the usability of the short range hash functions without sacrificing security. A possibility for the exchange between parties A and B is thus as follows:
1. A→B: $H(P_A, R_A)$, $P_A$
2. A←B: $P_B$, $R_B$ 3. A→B: $R_A$
4. A←B: $Bio_B(V(C(P_A, P_B; R)))$
5. A→B: $Bio_A(V(C(P_A, P_B; R)))$ where H( ) is a suitable cryptographic hash function like SHA-256;

$R=f(R_A, R_B)$, where f( ) is a combining function such as a hash function or just concatenation;

C(M; k) is a truncated Message Authentication Code (MAC) of message M with key k (the result is a short string).

This mechanism allows calculation of a short check value such that for verifying the authenticity it is enough to authenticate the key exchange.

In the procedure above, it is possible to leave out the random numbers in the hash commitment procedure. This may require use of fresh public keys each time the protocol is run. By including random numbers in the hash commitment procedure (i.e. steps 1 to 3 above), instead of, or in addition to, using public keys, re-use of key-pairs can be allowed.

The above embodiments are intended for use with an initial key agreement. Once a shared key is agreed, it is possible to use this key to secure subsequent connections without applying any biometric authentication mechanisms. In accordance with an embodiment an on-demand verification procedure may be provided. In this embodiment either party is allowed to invoke biometric authentication on-demand at any time. This may be especially useful if it is suspected that the original authentication may have been flawed.

This may be provided in a similar way as the embodiment described above, except that the two parties are attempting to authenticate the shared key "K" they have agreed previously, rather than exchanging public keys. Thus the procedure can be written:

1. A→B: $H(K, R_A)$
2. A←B: $R_B$
3. A→B: $R_A$
4. A←B: $Bio_B(V(C(K; R)))$
5. A→B: $Bio_A(V(C(K; R)))$ where H( ) is a suitable cryptographic hash function, for example SHA-256;

$R_A$, $R_B$ are random values by A and B, respectively $R=f(R_A, R_B)$, where f( ) is a combining function such as a hash function or just concatenation; and C(K; R) stands for a truncated Message Authentication Code (MAC) of message K with key R C(M; k), the result being a short string.

Optionally, once the partied have performed a re-authentication of an in-use key K, they can update key K to a new value by combining the random numbers used in the authentication with it. For example, the new key K' can be computed as $f1(K, R_A, R_B)$ where f1( ) is a suitable key derivation function, for example a cryptographic hash function.

A further embodiment provides support for arbitrary dictionaries. In the above embodiments function V( ) is used for converting security critical data to a form that can be biometrically rendered. To provide a high security of the key exchange, both the sender and the recipient may need to know and use exactly the same function V( ). It may be desirable, for example to ease the use, to use a function V( ) which results in vocalizable and readable representations such as the one based on a MadLib dictionary discussed above. However, hardwiring a fixed dictionary into the implementation may not always be desirable. This can be addressed by including a statistically or otherwise unique "dictionary identifier" as an additional argument to function V( ): i.e., V(dictionary_id, input_string).

A dictionary or dictionaries can be hardwired into the mechanism. Examples of these include reading input_string digit by digit and the MadLib dictionary. These dictionaries will have pre-assigned dictionary_id values included in every implementation of the protocol. However, one party could pick an arbitrary source of data to be used as the dictionary (for example, if the value of the $i^{th}$ byte in an input_string is mapped to the $i^{th}$ word in the front page of a particular newspaper). In this case, a statistically unique dictionary_id can be defined as a cryptographic hash of the dictionary (i.e., all words in the front page of the newspaper).

If an attacker changes the dictionary_id it might be desired to detect this. For this reason, dictionary_id is advantageously included into input_string itself. If the input_ string itself is computed as a one-way function, preferably dictionary_id should be added to the input of that function.

When arbitrary dictionaries are used, each party can send the source of a dictionary (e.g., a URL) to the other party, and each party may then compute the dictionary_id on its own.

As a concrete example, the embodiment using random challenges can be modified as follows. Suppose $u_A$ and $u_B$ are universal resource locators (URLs) pointing dictionaries chosen by parties A and B, respectively and the hashes of the contents of this dictionary is $h_A$ and $h_B$, respectively. The exchange protocol can then be expressed as:

1. A→B: $u_A, u_B, C_A, P_A$
2. A←B: $Bio_B(V(f(h_A, C_A, C_B, P_B))), P_B, C_B$
3. A→B: $Bio_A(V(f(h_B, C_B, C_A, P_A)))$

Similar modifications can be applied to the other embodiments to enable use of arbitrary dictionaries.

Instead of letting a user to choose a dictionary, an alternative is to use information related to the key agreement in selecting a dictionary. For example, in the embodiments above wherein random values $R_A$ and $R_B$ were used, a dictionary may be chosen by applying a one-way hash function f2( ) as $d=f2(K, R_A, R_B)$ and mapping d appropriately to select the dictionary. As an example, if d is a 160 bit string, one part of d can be used to select one of several on-line newspapers, a second part of d can be used to select a date, and a third part of d can be used to select the page. The words on the page may then be used as the dictionary to map bit strings to words. An advantage of this approach of choosing the dictionary is that the number of potential dictionaries may be made relatively large, and it would be infeasible to use pre-recorded biometric renderings.

It is noted that in all of the above embodiments the two parties involved in the communication can use different mechanisms to create a media clip. For example, party A can generate a voice clip while party B can generate a video clip and so on.

The above discussed mechanisms can be implemented in any communication device provided with appropriate data processing facility using combinations of software and hardware. Both parties may require appropriate media recording and playback hardware in their devices. For instance, if voice clips are used both ways, then both communicating devices need to have a voice recorder and voice playback functionalities. These are readily available in a great variety of user devices, such as mobile phones and other mobile computing platforms as well as in personal computers. If video clips are used, then both communicating devices may need to have a video camera and video playback functionalities. Hand writing detection and recording device can be provided in application where a user may input the input parameter by writing it on an appropriate user interface.

The required data processing functions may be provided by means of one or more data processors provided in the data processing apparatus or elsewhere. An appropriately adapted computer program code product or products may be used for implementing the embodiments, when loaded on an appropriate processor. The program code means may, for example, perform at least one of the task of generating and/or interpreting the biometric information and controlling sending and/or receiving the information and controlling use of the biometric information and so forth. The program code product for providing the operation may be stored on and provided by means of a carrier medium such as a carrier disc, card or tape. A possibility is to download the program code product to the mobile device via a data network.

It is noted that whilst embodiments have been described in relation to communication devices such as mobile devices and wireless communication systems, embodiments of the present invention are applicable to any communication system wherein verification of authenticity of exchanged security parameters may be desired.

It is also noted that the above examples do not deal with the notion of identities. Instead, they are for assisting two parties who are able to recognize biometric data of each other, for example characteristic features of voice and so forth, to establish a shared key.

The embodiments may allow secure establishment of shared secrets between two communicating parties without relying on pre-established shared secrets or public-private key pairs. The embodiments are relatively easy to implement and intuitive for parties. The embodiments tie naturally with human-to-human secure communications and can be applied to applications such as Voice-over-IP, gaming, file sharing, and so forth.

It is also noted herein that while the above describes exemplifying embodiments of the invention, there are several variations and modifications which may be made to the disclosed solution without departing from the scope of the present invention as defined in the appended claims.

We claim:

1. A method, comprising:
receiving a first media clip by a first processor, wherein the first media clip comprises a pre-recorded biometric rendering of biometric information associated with a personal feature of a first party based on a recording of the first party presenting a predefined input parameter;
verifying, via the first processor, the first media clip to authenticate a security parameter associated with the first party, wherein the first processor automatically verifies the first media clip based on the biometric information associated with the personal feature of the first party; and,
subsequent to a positive verification by the first processor of the authenticity of the security parameter associated with the first party:
generating a second media clip from a biometric rendering of biometric information associated with a personal feature of a second party based on a recording of the second party resenting a second predefined input parameter;
sending said second media clip to the first party;
receiving said second media clip by a second processor; and
verifying, via the second processor, the second media clip to authenticate a security parameter received from the second party, wherein the second processor automatically verifies the second media clip based on the biometric information associated with the personal feature of the second party.

2. The method as claimed in claim 1, wherein the predefined input parameter comprises at least one of a public key, a Diffie-Hellman parameter, a random challenge, a time indication, a value provided by a combination of random values generated by the first party and the second party, a shared key, a message authentication code, and a dictionary identifier.

3. The method as claimed in claim 1, comprising sending the first media clip in a message also comprising the security parameter, the security parameter being provided by at least one of a public key, a Diffie-Hellman parameter, a random challenge and a time indication.

4. The method as claimed in claim 1, wherein the first media clip comprises at least one of an audio clip and a video clip.

5. The method as claimed in claim 1, comprising using the first media clip as a signature of the security parameter.

6. The method as claimed in claim 1, wherein the predefined input parameter comprises at least one of an identity function, a hash function and a short range one-way hash function.

7. The method as claimed in claim 1, wherein the sending comprises sending a function for converting the first media clip into a format suitable for presentation by a user interface of the second party.

8. The method as claimed in claim 1, comprising:
applying a hash commitment procedure to communications between the first party and the second party; and
sending at least one of a check string and a random value in association with said biometric information between the first party and the second party.

9. The method as claimed in claim 1, wherein the verifying comprises verifying the authenticity of at least one key during an initial key agreement stage.

10. The method as claimed in claim 1, comprising:
agreeing at least one shared security parameter between the parties, and
using the agreed security parameter in communications between the first party and the second party,
wherein the verifying comprises verifying the authenticity of at least one security parameter subsequent said agreeing of at least one shared security parameter.

11. The method as claimed in claim 1, comprising communicating the first media clip to the second party in response to a request for verification.

12. The method as claimed in claim 1, wherein the generation comprises generation of the first media clip using arbitrary dictionaries.

13. The method as claimed in claim 1, comprising selection of a dictionary, generating the first media clip by taking the selection in to account, and communicating information about the selection between the parties along with the first media clip.

14. An apparatus, comprising:
a recording device configured to generate a first media clip from a biometric rendering of biometric information associated with a personal feature of a user thereof based on a presentation by the user of a predefined input parameter, wherein the first media clip is recorded prior to sending the first media clip for verification; and an interface configured to send the first media clip for use for verifying the media clip to authenticate, by a first processor, of a security parameter associated with the user, wherein the processor receives and automatically verifies the first media clip based on the biometric information associated with the personal feature of the first party, and wherein, subsequent to a positive verification by the first processor of the authenticity of the security parameter associated with the first party a second media clip is generated from a biometric rendering of biometric information associated with a personal feature of a second party based on a recording of the second party presenting a second predefined input parameter, said second media clip is sent to the first party, said second media clip is received by a second processor, and, via the second processor, the second media clip verified to authenticate a security parameter received from the second party, wherein the second processor automatically verifies the second media clip based on the biometric information associated with the personal feature of the second party.

15. The apparatus of claim 14, wherein the predefined input parameter comprises at least one of a public key, a Diffie-Hellman parameter, a random challenge, a time indication, a value provided by a combination of random values, a shared key, a message authentication code, and a dictionary identifier.

16. The apparatus as claimed in claim 14, configured to send the first media clip in a message comprising at least one of a public key, a Diffie-Hellman parameter, a random challenge and a time indication.

17. The apparatus of claim 14, wherein the recording device comprises at least one of a digital camera, a digital video camera, a digital voice recorder and a handwriting recognition device.

18. The apparatus of claim 14, comprising:
an interface configured to receive a second media clip generated from a biometric rendering of biometric information associated with a personal feature of a second party; and
a processor configured to verify the second media clip to authenticate a security parameter associated with the second party.

19. The apparatus of claim 14, comprising:
an interface configured to receive messages containing a security parameter and a second media clip generated from a biometric rendering of biometric information associated with a personal feature of a second party;
a user interface; and
a controller configured to present, via the user interface, at least one of audio presentations and video presentations based on the biometric information.

20. An apparatus, comprising:
an interface configured to receive a first media clip transmittable over a communication network and generated from a biometric rendering of biometric information associated with a personal feature of a first party, the biometric information being based on a presentation by the first party of a predefined input parameter, wherein the first media clip is recorded prior to the transmission over the communication network; and
a first processor configured to receive and verify the first media clip to authenticate a security parameter associated with the first party, wherein the first processor automatically verifies the first media clip based on the biometric information associated with the personal feature of the first party, and wherein, subsequent to a positive verification by the first processor of the authenticity of the security parameter associated with the first party a second media clip is generated from a biometric rendering of biometric information associated with a personal feature of a second party based on a recording of the second party presenting a second predefined input parameter, said second media clip is sent to the first party, said second media clip is received by a second processor, and, via the second processor, the second media clip verified to authenticate a security parameter received from the second party, wherein the second processor automatically verifies the second media clip based on the biometric information associated with the personal feature of the second party.

21. The apparatus of claim 20, wherein the predefined input parameter comprises at least one of a public key, a Diffie-Hellman parameter, a random challenge, a time indication, a value provided by a combination of random values, a shared key, a message authentication code, and a dictionary identifier.

22. The apparatus of claim 20, comprising:
a user interface; and
a controller configured to present via the user interface at least one of audio presentations and video presentations based on the biometric information.

23. The apparatus of claim 20, comprising:
a processor configured to generate biometric information based on a presentation of an input parameter by a user of the apparatus and to use the biometric information as a signature of a security parameter associated with the user; and
an interface configured to send the signature to the other party for use in authentication of the security parameter.

24. The apparatus of claim 23, comprising a recording device comprising at least one of a digital camera, a digital video camera, a digital voice recording device and a handwriting recognition device.

25. A computer program embodied on a non-transitory computer-readable medium, the computer program configured to provide a method comprising generating a first media clip from a biometric rendering of biometric information associated with a personal feature of a first party based on a recording of the first party presenting a predefined input parameter, wherein the first media clip is recorded prior to sending the first media clip to a second party for verification;
including said first media clip into a message containing a security parameter associated with the first party, wherein the first media clip is included into the message so that verification of the first media clip is used to authenticate the security parameter by a first processor, and
sending the message to the second party, wherein the first processor receives and automatically verifies the first media clip based on the biometric information associated with the personal feature of the first party, and wherein, subsequent to a positive verification by the first processor of the authenticity of the security parameter associated with the first party, a second media clip is generated from a biometric rendering of biometric information associated with a personal feature of the second party based on a recording of the second party presenting a second predefined input parameter, said second media clip is sent to the first party, said second media clip is received by a second processor, and, via the second processor, the second media clip verified to authenticate a second security parameter received from the second party, wherein the second processor automatically verifies the second media clip based on the biometric information associated with the personal feature of the second party.

26. The computer program as claimed in claim 25, wherein the method controls sending of security parameters in a mobile device.

27. A computer program embodied on a non-transitory computer-readable medium, the computer program configured to provide a method comprising:
receiving a first media clip transmittable over a communication network and generated from a biometric rendering of biometric information associated with a personal feature of a first party based on a recording of the first party presenting a predefined input parameter, wherein the first media clip is recorded prior to the transmission over the communication network;
verifying, by a first processor, the first media clip to authenticate a security parameter received from the first party based on the biometric information, wherein the first processor receives and automatically verifies the first media clip based on the biometric information associated with the personal feature of the first party; and
subsequent to a positive verification by the first processor of the authenticity of the security parameter associated with the first party:
generating a second media clip from a biometric rendering of biometric information associated with a personal feature of a second party based on a recording of the second party presenting a second predefined input parameter;
sending said second media clip to the first party;
receiving said second media clip by a second processor; and
verifying, via the second processor, the second media clip to authenticate a security parameter received from the second party, wherein the second processor automatically verifies the second media clip based on the biometric information associated with the personal feature of the second party.

28. The computer program as claimed in claim 27, being configured to provide a method further comprising:
generating a second media clip transmittable over the communication network and generated from a biometric rendering of biometric information associated with a personal feature of a second party based on a recording of the second party presenting a predefined input parameter; and
sending the second media clip from the second party to the first party for verification of the second media clip to authenticate the security parameter associated with the second party.

29. The computer program as claimed in claim 27, wherein the method controls verification of security parameters in a mobile device.

30. A method, comprising:
recording a media clip of a party presenting an input parameter, wherein the first media clip is recorded prior to sending the first media clip to a second party, and wherein the first media clip comprises a pre-recorded biometric rendering of biometric information associated with a personal feature of a first party based on a recording of the first party presenting a predefined input parameter;
using the media clip as a signature of a security parameter associated with the first party; and
sending the security parameter with the signature to the second party, wherein, by a processor, the first media clip is verifiable by the second party to authenticate the security parameter associated with the first party, wherein the processor receives and automatically verifies the first media clip based on the biometric information associated with the personal feature of the first party, and
subsequent to a positive verification by the first processor of the authenticity of the security parameter associated with the first party:
generating a second media clip from a biometric rendering of biometric information associated with a personal feature of a second party based on a recording of the second party presenting a second predefined input parameter;
sending said second media clip to the first party;
receiving said second media clip by a second processor; and
verifying, via the second processor, the second media clip to authenticate a security parameter received from the second party, wherein the second processor automatically verifies the second media clip based on the biometric information associated with the personal feature of the second party.

31. The method as claimed in claim 30, wherein the recording of the media clip comprises at least one of recording a read out of an input string by the party or a handwriting of an input string.

32. The method as claimed in claim 30, comprising converting the input parameter to a syntactic string of characters.

33. The method as claimed in claim 30, wherein the recording of the media clip comprises recording a presentation of at least one of a public key, a Diffie-Hellman parameter, a random challenge, an indication of the time of preparing the recording, a value provided by a combination of random values, a shared key, a message authentication code, and a dictionary identifier.

34. A method, comprising:
sending a first message including a hash of a security parameter and a first random value from a first party to a second party;
sending a second message including a second random value from the second party to the first party;
sending a third message including the first random value from the first party to the second party;
generating a first media clip from a biometric rendering of biometric information associated with a personal feature of the second party based on a recording of the second party presenting an input parameter that is based on the information in the first message, the second message and third message;
sending said first media clip associated with the second party to the first party;
generating a second media clip from a biometric rendering of biometric information associated with a personal feature of the first party based on a recording of the first party presenting the input parameter; and
sending said second media clip associated with the first party to the second party for verification by a processor.

35. The method as claimed in claim 34, wherein the security parameter in the first message further comprises one of a public key and a shared key.

36. The method as claimed in claim 34, wherein the second message includes a second security parameter associated with the second party.

37. An apparatus, comprising:
  means for generating a first media clip from a biometric rendering of biometric information associated with a personal feature of a user thereof based on a presentation by the user of a predefined input parameter, wherein the first media clip is recorded prior to sending the first media clip for verification;
  means for sending the first media clip wherein the first media clip is verifiable by a receiver to authenticate, by a first processor at the receiver, a security parameter associated with the user, wherein the first processor receives and automatically verifies the first media clip based on the biometric information associated with the personal feature of the user,
  means for receiving another media clip generated from a biometric rendering of biometric information associated with another party based on a recording of another presentation by said another party of another predefined input parameter; and
  means for verifying, subsequent to a positive verification by the first processor of the authenticity of the security parameter associated with the user, via a second processor, said another media clip to authenticate a security parameter associated with said another party, wherein the second processor automatically verifies said another media clip based on the biometric information associated with the personal feature of said another party.

38. An apparatus, comprising:
  means for receiving a first media clip generated from a biometric rendering of biometric information associated with a personal feature of another party, the biometric information being based on a presentation by the another party of a predefined input parameter, wherein the first media clip is recorded prior to transmission;
  means for verifying, via a first processor, the first media clip to authenticate a security parameter associated with the another party, wherein the first processor receives and automatically verifies the first media clip based on the biometric information associated with the personal feature of the another party, and wherein, subsequent to a positive verification by the first processor of the authenticity of the security parameter associated with the another party a second media clip is generated from a biometric rendering of biometric information associated with a personal feature of a second party based on a recording of the second party presenting a second security parameter, said second media clip is sent to the another party, said second media clip is received by a second processor, and, via the second processor, the second media clip verified to authenticate the second security parameter received from the second party, wherein the second processor automatically verifies the second media clip based on the biometric information associated with the personal feature of the second party.

* * * * *

UNITED STATES PATENT AND TRADEMARK OFFICE
CERTIFICATE OF CORRECTION

PATENT NO. : 9,503,462 B2  
APPLICATION NO. : 11/672900  
DATED : November 22, 2016  
INVENTOR(S) : Asokan et al.

It is certified that error appears in the above-identified patent and that said Letters Patent is hereby corrected as shown below:

In the Claims

Claim 1, Column 11, Line 65 "resenting" should be deleted and --presenting-- should be inserted.

Signed and Sealed this  
Thirty-first Day of January, 2017

Michelle K. Lee  
*Director of the United States Patent and Trademark Office*